United States Patent [19]

Ulich

[11] Patent Number: 4,862,257
[45] Date of Patent: Aug. 29, 1989

[54] IMAGING LIDAR SYSTEM
[75] Inventor: Bobby L. Ulich, Tucson, Ariz.
[73] Assignee: Kaman Aerospace Corporation, Bloomfield, Conn.
[21] Appl. No.: 216,341
[22] Filed: Jul. 7, 1988
[51] Int. Cl.$^4$ ............................................. H04N 7/18
[52] U.S. Cl. ..................................... 358/95; 358/211; 358/109
[58] Field of Search .................... 358/95, 211, 93, 109

[56] References Cited

U.S. PATENT DOCUMENTS

| | | | |
|---|---|---|---|
| 2,541,374 | 2/1951 | Morton | 313/399 |
| 3,426,207 | 2/1969 | Fried et al. | 455/611 |
| 3,467,773 | 9/1969 | Heckman et al. | 358/95 |
| 3,566,021 | 2/1971 | Jakes, Jr. | 358/90 |
| 3,670,098 | 6/1972 | Korpel | 358/112 |
| 3,895,388 | 7/1975 | Townsend | 358/95 |
| 3,947,119 | 3/1976 | Bamberg | 358/95 |
| 4,030,831 | 6/1977 | Gowrinathan | 356/359 |
| 4,143,400 | 3/1979 | Heckman | 358/95 |
| 4,174,524 | 11/1979 | Moran | 358/95 |
| 4,195,311 | 3/1980 | Moran | 358/95 |
| 4,646,140 | 2/1987 | Bailey | 358/211 |
| 4,796,090 | 1/1989 | Fraier | 358/211 |

Primary Examiner—Howard W. Britton
Attorney, Agent, or Firm—Fishman, Dionne & Cantor

[57] ABSTRACT

A novel system for remote detection and imaging of underwater objects is presented. In accordance with the present invention, a laser is used to generate short pulses of light with pulse widths on the order of nanoseconds. The laser light is expanded by optics and projected down towards the surface of the water and to an object. Intensified CCD (charge coupled device) cameras (preferably two) are electronically shuttered after the time delay corresponding to the round trip propagation time and from to the object. This timing eliminates light scattered by the water from in front of and behind the object. As a result, the veiling luminance of the water is greatly attenuated and faint target signatures can be seen. The resulting gated images (displayed on a CRT) have sufficient spatial resolution to classify and/or identify the object. The imaging lidar system of the present invention takes advantage of the fact that all opaque targets will cast a shadow. The exposure of the two cameras in the system are timed such that one camera gives an image of the object against the backscattered light from the water while the other camera gives an image of the shadow of the object against the backscattered light. These two images are then subtracted to improve the detectability of the object.

40 Claims, 4 Drawing Sheets

IMAGING LIDAR SYSTEM

BACKGROUND OF THE INVENTION

This invention relates generally to a method and apparatus for remote imaging of underwater objects. More particularly, this invention relates to a method for detecting and imaging underwater objects using a novel imaging lidar (light detection and ranging) system.

There is a continuing need to develop methods of detecting underwater targets from remote locations (e.g. airborne) and over relatively short time periods. This is of particular importance in the case of certain military applications where, for example, the detection of moored mines from helicopters and other aircraft is vital to ensuring safe seas. Presently, cumbersome and time consuming wire line devices must be used. These devices are lowered into the water and of course, are easily subject to damage and loss. Also, wire line devices make target searching relatively slow and can only detect targets without providing visual imaging.

In addition to detection of underwater mines, other military applications for underwater target detection systems include the detections of submarines and communication buoys. There are also a number of civilian applications for an accurate system for remote detection of underwater objects.

Unfortunately, no workable system for the remote detection and imaging of objects underwater (or objects obscured by other media such as ice, snow, fog, smoke, and dust) is known which obtains accurate and precise imaging over short time periods and from a variety of remote platforms including aircraft, ships and submarines.

SUMMARY OF THE INVENTION

The above-discussed and other problems and deficiencies of the prior art are overcome by the novel system of the present invention for remote detection and imaging of underwater objects. The present invention is designated herein as imaging lidar. In accordance with the present invention, a laser is used to generate short pulses of light with pulse widths on the order of nanoseconds. The laser light is expanded by optics and projected down toward the surface of the water and to an object or target. Intensified CCD (charge coupled device) cameras (preferably two) are electronically shuttered after a time delay corresponding to the round trip propagation time to and from the target. This timing eliminates light scattered by the water in front of and behind the target. As a result, the veiling luminance of the water is greatly attenuated and faint target signatures can be seen. The resulting gated images (displayed on a CRT) have sufficient spatial resolution to classify and/or identify the target. This imaging feature offers the potential of reduced false alarm rates compared to non-imaging system.

The imaging lidar system of the present invention takes advantage of the fact that all opaque targets will cast a shadow. The exposure of the two cameras in the system are timed such that one camera gives an image of the target against the backscattered light from the water while the other camera gives an image of the shadow of the target against the backscattered light. These two images are then subtracted (e.g. differential imaging) to improve the detectability of the target. The subtracted image can then be colorized to assist in identification of the target.

In effect, the subtraction of the two images provides improved signal-to-noise ratio (SNR) of the imaged target. The SNR provided by the differential imaging is predicted by a theoretical model which is given by the detected target photons minus the detected water background photons over the square root of the sum of the detected Photons.

The present invention can be operated both at night and during the day. For daytime use, bandpass filters centered on the laser line and having a bandpass of several nanometers are placed on the camera lenses. The combination of the short exposure time of the cameras and the attenuation due to the bandpass filter makes the sunlight contribution to the images negligible.

The imaging lidar system of this invention is not confined to imaging down through the air-water interface. An identical system may be deployed from an underwater vessel for viewing scenes in any direction under the water. Similarly, this invention could be used for viewing through ice (such as the polar ice caps) and other media. In fact, the only requirement of the physical form of the medium is that the medium be at least partially transmitting to the light over a distance scale corresponding to several camera gate widths. Thus, the medium may include water, steam, fog, smoke, ice, snow, aerosols, dust, etc.

The above-discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
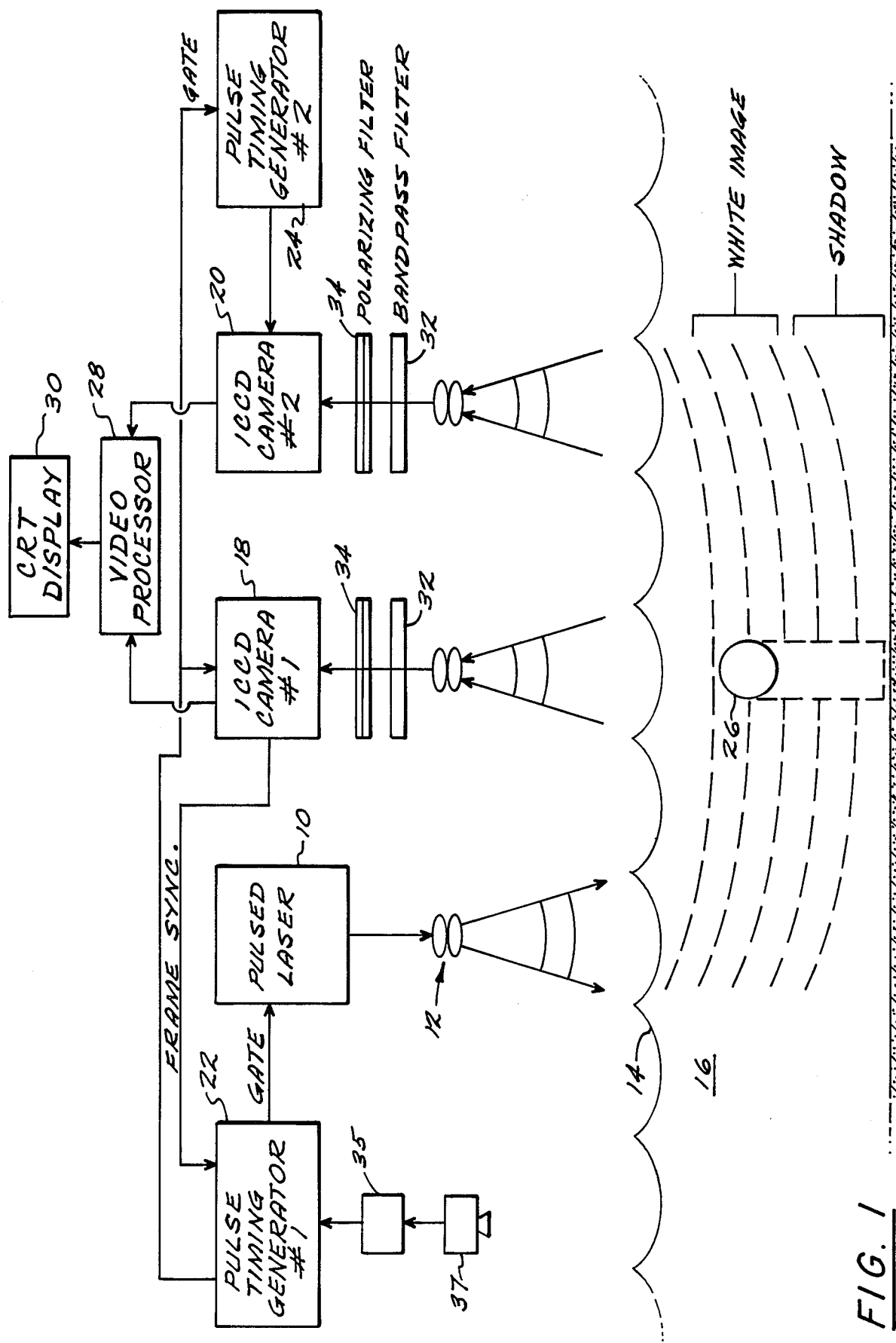
FIG. 1 is a block diagram depicting the imaging lidar system in accordance with the present invention.

Referring first to FIG. 1, the imaging lidar system of the present invention generally comprises a laser 10 which is used to generate short pulses of light with pulse widths on the order of nanoseconds (e.g. less than about 10 nm). The laser light is expanded by optics 12 toward the surface 14 of a body of water 16. A pair of intensified CCD cameras 18 and 20 are electronically shuttered via pulse timing generators 22 and 24 after a time delay corresponding to the round trip propagation time to and from a target 26. This timing eliminates light scattered by the water in front of and behind the target. As a result, the veiling luminance of the water is greatly attenuated and faint target signatures can be seen. The light signals received by cameras 18 and 20 are processed by video processor 28 and displayed on CRT 30. The resulting gated images have sufficient spatial resolution to classify and/or identify the target.

The lidar system of FIG. 1 can be operated both at night and during the day. For daytime use, bandpass filters 32 centered on the laser line and having a bandpass of several nanometers are placed on the camera lenses. The combination of the short exposure time of the cameras and the attenuation due to the bandpass filter makes the sunlight contribution to the images negligible. Two pairs of polarizing filters 34 may also be optionally used.

A photodiode or photomultiplier tube 35 is used in ocean applications. The reflectivity of seawater is approximately 0.02, so a fraction of the laser light is reflected by the surface and detected by the avalanche photodiode or photomultiplier tube 35. This surface return signal is used to adjust the timing delay to account for variations in the altitude of the platform. The wave action on the surface affects the image of underwater objects, causing the image to quiver and even break up into multiple images. However, the shapes and details of objects are still recognizable to an observer looking at the image since the eye tends to average out the action of the waves.

The use of two ICCD cameras 18 and 20 for providing differential imaging are an important feature of the present invention which combine to improve detectability and imaging of the underwater object. The two cameras take advantage of the fact that all opaque targets will cast a shadow. The exposures of the two cameras are timed such that one camera gives an image of the target against the back scattered light from the water while the other camera gives an image of the shadow of the target against the backscattered light. These two images are then subtracted to improve the detectability of the target. The subtracted image can then be colorized to assist in identification of the target.

The differential imaging feature of this invention improves the signal-to-noise ratio (SNR). The signal-to-noise ratio (SNR) of an imaged target is affected by the properties of the water and by the depth of the target. The laser light is attenuated by absorption and scattering due to the water. The deeper a target is, the less light reaches the target and the less light is transmitted back to the system collection optics. The effective attenuation coefficient is the diffuse attenuation coefficient for water, K. K ranges from a value of approximately 0.05 per meter in clear, deep ocean water to values of 1.0 per meter in coastal waters. The SNR of the system is also affected by the laser pulse energy, the areas of the camera lenses, the height of the system above the water, the reflectivity of the target, and the quantum efficiency of the camera detection system. A theoretical model has been constructed to predict the SNR of a target at different depths and values of K. Since the cameras are intensified, the dominant noise in detecting a target is the inherent photon noise. The SNR is then given by the detected target photons minus the detected water background photons over the square root of the sum of the detected photons.

The present invention will now be described in much greater detail. It will be appreciated that the following description is of a preferred embodiment and that the particular component models, manufacturers and similar details are by example only.

Pulsed Laser

The preferred laser system used with the system of this invention is a Spectra Physics DCR-4 pulsed Nd:YAG laser which emits short pulses of infrared light at 1064 nm. The laser is operated in the green (532 nm) through the use of a Harmonic Generator which contains a frequency doubling crystal. The Harmonic Generator is externally mounted in front of the exit port of the laser cavity. The angle at which the initial laser pulse (1064 nm) strikes the crystal can be fine tuned so that the percentage of green light vs. IR that exits the Harmonic Generator can be varied. In general, the Harmonic Generator has an efficiency of approximately 50%, so the output power in the green is about half of the infrared input power.

Figure 3:
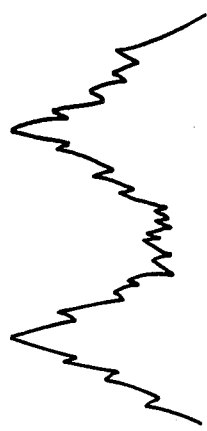
FIG. 3 is a diagram of a spatial profile of a single pulse from the laser of FIG. 2.
Figure 2:
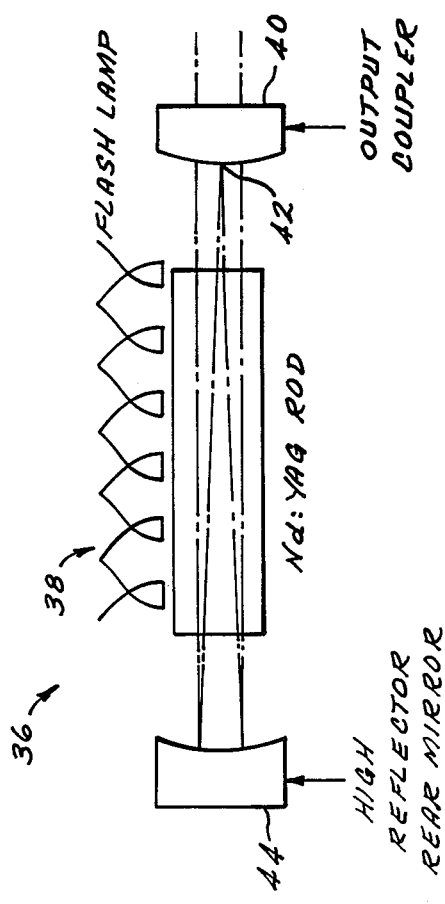
FIG. 2 is a schematic diagram of the pulsed laser used in the system of FIG. 1.

As shown in FIG. 2, the pulsed Nd:YAG laser uses a diffraction-coupled resonator 36 which provides high energy, good stability, good beam quality, and a high degree of spatial coherence. The Nd:YAG rod is optically excited through the use of a high voltage flash lamp 38. The output coupler (front lens 40) has a single high reflectivity dot 42 located in the center of the convex substrate. The rear mirror 44 is a concave high reflector which collimates the beam and will compensate for the thermal lensing of the Nd:YAG rod. The collimated beam passes through the rod on its exit path, and the light diffracts around the edge of the dot located on the front output coupler. This produces a characteristic "donut" spatial profile, as shown in FIG. 3. A Q-switch (Pockels cell) is used in conjunction with a Marx band and a quarter-wave plate to regulate the temporal width of the pulse. The initial storage of energy is accomplished by the quarter-wave plate. The light pulse is formed by applying a very high speed, high voltage waveform to the Pockels cell.

The preferred output specifications of the Nd:YAG laser being used for the system of this invention are:

| | |
|---|---|
| Pulse width at 532 nm | $\approx 3$ ns |
| Pulse energy at 532 nm | $\approx 550$ milijoules |
| Pulse repetition rate | 15 Hz |
| Output pulse jitter | $<0.5$ nsec from sync pulse |
| Total unit weight | $\approx 230$ Kg |

The laser is externally cooled through the use of a self-contained cooling system. In addition, all cavities are air purged. The cooling system, electronics and purge system are housed in a separate power supply which is rack mountable. All cables, air and water lines are connected to the laser head and power supply by a 10 ft. umbilical cord. The laser can be operated at 208V, 60 Hz, single phase power, or with 120/220V power.

Cameras

Figure 4:
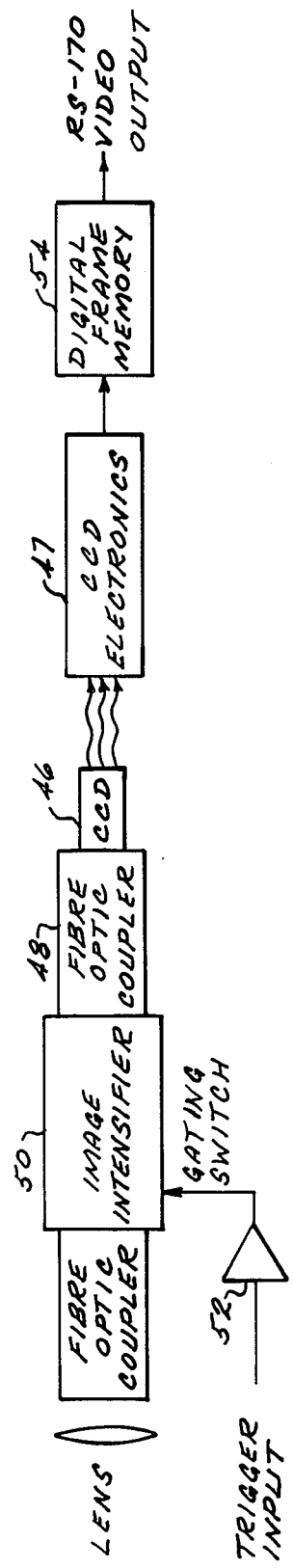
FIG. 4 is a schematic diagram of one of the CCD cameras used in conjunction with the system of FIG. 1.

The preferred system of the present invention uses two Marco Scientific Model 201 Cameras, one of which is shown in FIG. 4. The image sensor 46 used in these cameras is a Thompson CSF model TH-7882-FO charge coupled device (CCD) driven by CCD electronics package 47. This particular CCD features a fiber optic window 48 which is used to couple the sensor to an intensifier tube. The intensifier tube 50 serves as both a light amplifier and an ultrafast shutter driven by a high voltage amplifier 52. These cameras also include a built-in digital frame store/scan converter 54 whose output is converted to RS170 analog signal for display on a standard monitor 30 and for additional image processing.

The intensifier tube 50 is a DEP Model XX1420 with two gain stages. The first is a Gen II type intensifer with microchannel plate (MCP); the second is a Gen I proximity focused diode. Net luminance gain is nominally 100,000. The tube's S-20 photocathode defines the spectral response for the entire camera and establishes the quantum efficiency limitation at about 7%. The anode phosphor on the back end of the tube is fiber-optically coupled to the CCD sensor. A control switch on the camera body allows selection of an intensifier gate width of 10, 20 or 40 nsec. This is equivalent to an exposure setting for the camera.

The CCD being used is a novel frame transfer device. Normally in prior known RS170 compatible frame transfer devices, an image is integrated on the image area and then shifted to an adjacent storage area of the CCD. With each new TV line, the horizontal register shifts the stored information out. Since normal TV operates in an interlace mode, a phase shift between the odd and even field allows the CCD to operate in a kind of interlace readout mode. In these prior devices, the storage area occupies half the sensor and only half the elements actually integrate light. It is important to note that the sensor being used in the Model 201 Camera of this invention uses the entire area of the chip for light integration and, as such, is generally not compatible with standard RS170 operation. As will be discussed hereinafter, there are marked benefits of having a 100% sensitivity chip area in terms of ultimate system sensitivity.

The CCD features 568 lines by 382 columns of 23 micrometer square pixels in a contiguous format. Of this array, only a nominal 512 lines are used to achieve the correct aspect ratio for display on a standard video monitor (4:3 aspect ratio). Because of the desire for maximum signal-to-noise ratio and due to the limited requirement for spatial resolution, the Model 201 Camera takes advantage of pixel binning. The horizontal register shifts two charge packets into each charge detection stage before the stage is reasserted and four CCD lines are shifted to the horizontal shift register and summed before transfer. In this manner, the effective array becomes 128 lines by 191 columns of elements (bins) measuring 92 $\mu m \times 46$ $\mu m$. Each of these bins possesses the same readout noise limitation as a single pixel but collects 8x the signal. Binning thus offers an improvement in SNR of about 2.8.

As previously stated, the CCD being used here is generally not compatible with standard RS170 video output. In the imaging lidar system of the present invention, the following sequence takes place to achieve a suitable video output:

(1) The CCD is undergoing continual downward shifting of the horizontal shift registers to clear away any dark current build-up.

(2) An external trigger signal turns on the intensifier to start an exposure. Upon receipt of this signal the CCD shift mode is interrupted and for the next 3.2 msec, the CCD is in the integration mode. The 3.2 msec allows the phosphor persistence to decay to less than 5% after the short (20–40 nsec) exposure, thus serving to optimize SNR.

(3) At the end of the 3.2 msec, the CCD is switched into the readout mode where the accumulated charge for each bin is read into the digital frame store. In addition to the digitizing of the data, a format manipulation occurs in the frame store in which the sensor image is effectively rotated 90 degrees (i.e., columns are converted to rows and vice-versa). The 3:4 aspect ratio of the sensor now maps properly onto the 4:3 aspect ratio of a standard video monitor. This entire process takes $\approx 8.2$ msec.

(4) Once readout into the frame store is complete, the CCD reverts back to the continuous shift mode to eliminate dark current build-up until the next intensifier trigger is received.

A D/A converter outputs the frame store information as a composite video field. This field gets repeated at 60 Hz until the frame store is updated. Alternating fields in the composite video, although identical, get interlaced in the conventional manner. Each time the signal is received to begin an integration and readout on the sensor, a single blank field is generated on the composite video. Note that the total time for integration and readout (3.2+8.2 msec) is within a field interval (16.67 msec). It should be noted that the video field consists of 190 lines. After the 190 lines, the frame converter switches to a standard TV display mode and displays the remaining lines as black.

The two cameras must be operated in a synchronous mode to allow use of an analog subtractor for the two images. A synch cable interconnecting the two cameras permits the camera synch outputs from one camera to drive all the clock signals for the second camera. Either camera can function as the timing master with the other camera serving as the slave. When the cable is connected, a multiplexer circuit in the slave camera switches the clock signal from the internal controller chip to the external source. In this manner, the two cameras are synchronized pixel by pixel.

Several of the camera control features have already been mentioned. These include the external gating trigger via an input on the camera body and the gate width control switch (10, 20 or 40 nsec). Also found on the camera body are three outputs. The Gain Monitor shows a divided down replica of the high voltage gating pulse going to the intensifier tube. The Frame Synch out is a 1.98 $\mu$sec wide TTL negative pulse indicating the start of an odd field in the composite video, and thus occurring at 30 Hz. The Field Synch out is a 1.33 msec TTL negative pulse indicating the retrace blank (or vertical flyback) occurring between each field of the composite video at 60 Hz. A rack mountable power supply provides the low voltage power of the camera electronics as well as the high voltages needed for the two stages of the intensifier tube. There is potentiometer control for manual control of the high voltages on the power supply front panel. This is used to vary and monitor gain through the tube. In a preferred embodiment, an automatic gain control circuit is used to automatically correct gain at field rate.

Figure 5:
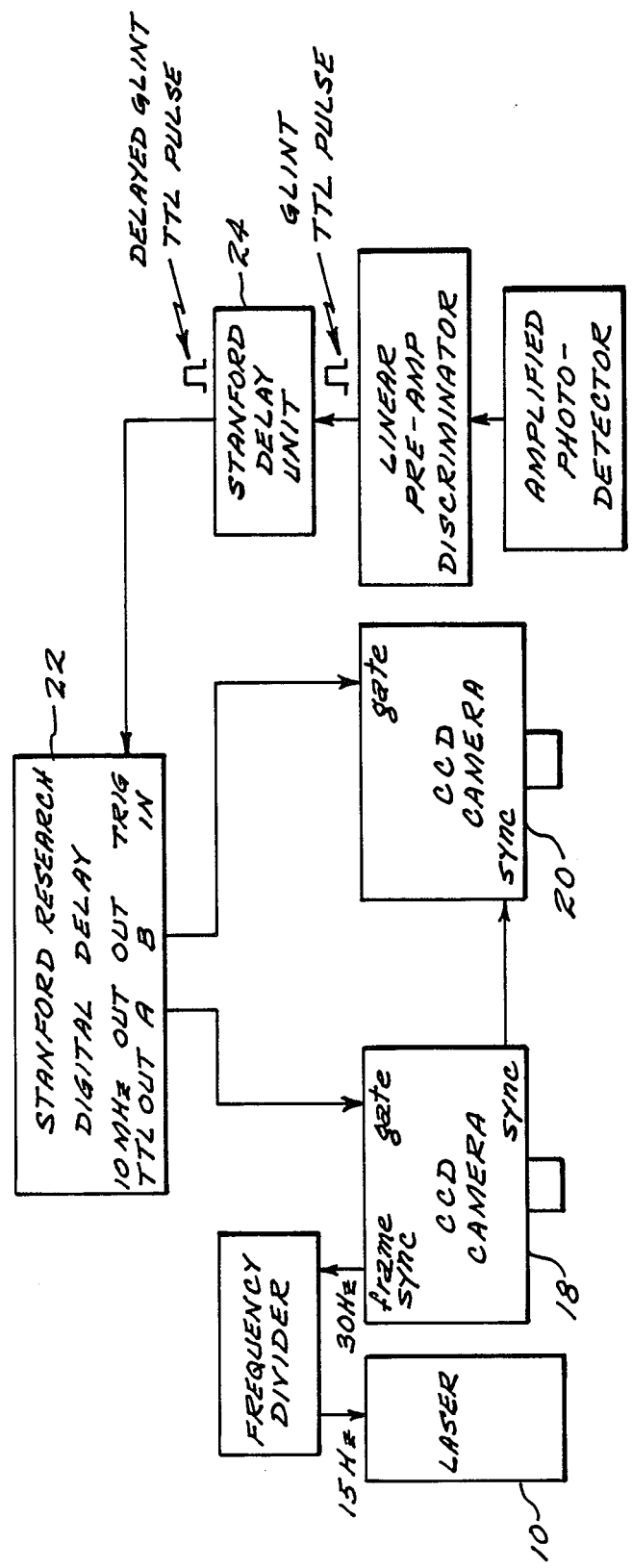
FIG. 5 is a schematic diagram of the timing control system for the CCD cameras of FIG. 4.

Referring to FIG. 5, the timing control schematic for the imaging lidar system of this invention is shown. The principal elements in the overall timing scheme are the "master" camera 60 and a Standard Research Model DG535 Digital Delay Generator 62. The 30 Hz Frame Synch signal from the master camera is divided down to 15 Hz and used to trigger the laser (see FIG. 1). Recall that the Frame Synch signal occurs at the beginning of the odd field interval in the camera's composite video. A laser output pulse is generated roughly 250 $\mu$sec after the trigger. The laser glint return from the water surface is detected by an Antel Optronics ARX - SA high speed avalanche photodetector 35 (see FIG. 1). Given the expected altitude of the platform in an operational system, glint detection will generally be on the order of 1 $\mu$sec after laser pulse out. The photodetector signal is conditioned through a Modern Instrument Technology F-100T Pulse Pre-Amp and Noise Discriminator 37. The threshold of the F-100T is set above the noise level and along the linear region of the signal source. A 100 ns wide TTL pulse is output when the signal source reaches the threshold level. This TTL pulse triggers Stanford delay unit 22 which delays the pulse about 3 μs before triggering a second Stanford delay unit 24. This second Stanford is the primary timing control for the system and is used to trigger intensifier gating for each of the two CCD cameras 18 and 20. It is set for A and B delays of (66 ⅔ ms−system delays+desired water depth delay). Hence, the cameras are actually triggered on the previously detected glint pulse. The 3 μs delay from the first Stanford is needed to decrease the time-out period of the second Stanford which is triggered at a constant rate of 15 Hz. System delays will be on the order of 130 ns (i.e. 40 ns propagation delay of the camera gate, 85 ns 48 ;{propagation delay of the Stanford, and <5 ns for other delays such as cable lengths, etc.). These delays can be accurately measured and should have jitter specifications <1 ns. The Stanford is capable of delaying a pulse very accurately for many millisec with its internal timebase oscillator. The RMS jitter specification is defined as: (50 ps+delay × 10E-8). For example, delays on the order of 70 ms have a RMS jitter spec of 0.7 ns. Once the system is calibrated, the delay is independent of distance from the water surface (i.e., the system automatically tracks changing platform altitude). However, this requires that the event be initiated accurately to within <2 ns at 15 Hz rep rate. This is possible only if the Frame Synch of the CCD camera is stable to <1 ns and the laser jitter referenced from TTL input is stable to <1 ns.

Considering the details of camera operation as described above, full system timing is now defined: The two camera's composite video signals are fully synchronized. At the beginning of every other odd video field, an event is initiated (i.e., the laser is pulsed at 15 Hz). The laser return is detected and the round trip pulse transit time is taken into account in gating the cameras on at the desired time for a given water depth on the next event (laser pulse). This gating will always occur during the first several hundred μ ec of alternating odd video field intervals. Then sensor integration and readout occurs for 3.2 μsec and 8.2 μsec, respectively. During this field interval when intensifier gating, sensor integration, and sensor readout occurs, an entire blank composite video field is read out of the camera's framestore. The ensuing three video fields are identical presentations of the captured event as read from the camera framestore. During this time, the camera waits for a trigger to initiate a new event and continually clears dark current from the CCD. The next trigger always occurs near the beginning of the fourth successive composite video field interval and the cycle is repeated.

Video Processor

Figure 6:
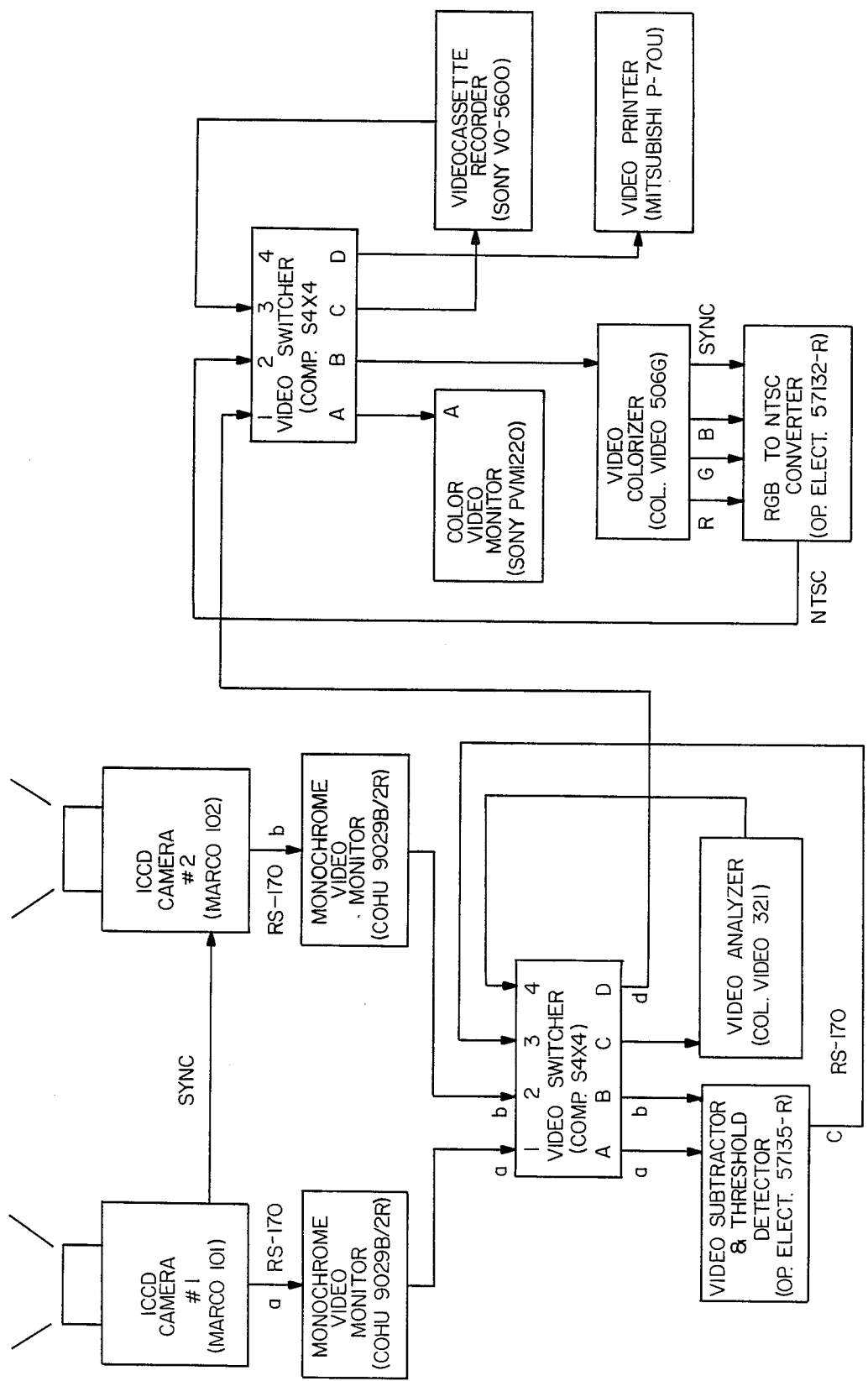
FIG. 6 is a schematic diagram of the video processing system used with the system of FIG. 1.

A schematic diagram of the video processing system is shown in FIG. 6. RS 170 signals from both intensified CCD cameras are first patched through monochrome video monitors (Kohu Model 9029B/2R) and are then fed into two inputs of the video switcher. Outputs A and B of video switcher number 1 are fed into the two inputs of the video subtractor and threshold detector (Optical Electronics model 67135-R). The output of this video subtractor is an RS170 monochrome video signal which is fed back through input number 3 of video switcher number 1.

Output C of video switcher number 1 is fed into a video analyzer (Colorado Video Model 320). This video analyzer has the capability of sampling the video intensity level in a strip across the picture and displaying this cross section of video intensity superimposed on the left side of the video. The output of this video analyzer is fed back to Input 3 of the video switcher number 1.

Video switcher number 2 input number 1 is fed from video switcher number 1 output D so that any of the four inputs can be fed from video switcher 1 to video switcher 2. That is, camera video number 1, camera video number 2, video subtractor output, or video analyzer output can be fed through video switcher number 2.

Also, the output of the video subtractor can be fed into the video analyzer. The video subtractor allows one to first adjust video input B by a variable gain factor ranging from one-fourth to four. It then subtracts this scaled version of video B from video A, adds an offset to the difference and multiplies the difference by a gain factor ranging from one to ten. The resulting output is essentially the difference between video A and video B with some adjustments for correcting for different camera gains.

The output A on video switcher number 2 is a color video monitor (Sony Model PVM-1220). Output B of video switcher number 2 goes into a video colorizer (Colorado Video Model 606G). The output of the video colorizer is composed of four signals, red, green, blue and sync. These four signals are fed into an RGB to NTSC converter (Optical Electronics Model 67132-R). This NTSC color composite video output is fed back into input 2 of video switcher 2.

Output C of video switcher number 2 goes to the video cassette recorder (Sony Model VO-5600) and the output of the video cassette recorder is fed back to input number 3 on video switcher number 2. Output D on video switcher number 2 goes to a video printer (Mitsubishi Model P-70U). These items of equipment allow one to produce a false color display of either camera 1, camera 2, or the difference between camera 1 and camera 2, to display this colorized signal on a video monitor, and to record it on a VCR. The VCR will record either monochrome or color signals. The video printer will not print in color, it only prints monochrome.

The use of two matrix video switchers allows one to easily reconfigure the video processor for diagnostic work, by looking at just one camera for instance; or, in the operational mode, where the signal is the difference in the videos, the difference is colorized, displayed and recorded.

Finally, the video subtractor contains a threshold detector which triggers a TTL Sonalert alarm and provides an electronic signal for external use when a target exceeds a certain intensity threshold. In practice, the video difference signal, which is the output of the video subtractor, is colorized and displayed on the color video monitor, and the threshold detector in the video subtractor is set so that noise or other defects in the signal will not cause it to trigger. It will only be triggered by the real target.

Camera Lens Optics

The imaging lidar system of this invention may optionally contain certain small optical filters including bandpass filters and polarizing filters. Two pairs of custom bandpass filters 32 can be used in the system.

The first pair is mounted in standard 52 mm photographic filter holders for use with the 25 mm f/0.85 Fujinon TV lenses. The field of view of these lenses are 20° half-field. The central wavelength and bandwidth of these filters are therefore made to be 537 nm and 11.8 nm respectively in order to make the transmission at 532 m as uniform as possible across the full field while minimizing the bandwidth. The second pair of filters 32 is mounted in special filter mounts that are bonded to the 75 mm focal length f/1.0 Kowa lenses. The filters are 3.5" in diameter and 0.335" thick. The central wavelength and bandwidth of these filters are made to be 532.6 nm and 1.4 nm respectively in order to make the transmission at 532 nm as uniform as possible over the 7° half-field of the Kowa lenses.

Two pairs of polarizing filters 34 may also be employed. The first pair are standard 52 mm photographic polarizing filters that screw onto the 52 mm threads of the bandpass filter mounts for the Fujinon lenses. The second pair of filters 34 mount into standard 95 mm Tippen polarizing filter mounts. These mounts screw into the bandpass filter mounts on the Kowa lenses.

Preferably, the laser 10 is used in conjunction with a scanning mirror assembly to divert light from a horizontal to a vertical direction.

The imaging lidar system of the present invention has been successfully tested in ocean water and has been found to provide reliable images of underwater objects from a remote position above the water.

It will be appreciated that while the present invention has been described with reference to a pair of CCD cameras, in a less preferred embodiment, only a single camera may be used. However, because a single camera cannot subtract out background noise, the SNR will be lower in this less preferred embodiment.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of detecting and imaging an object enveloped by a backscattering medium which is at least partially transmitting to light including the steps of:
   selectively generating short pulses of light;
   projecting said short pulses of light toward the backscattering medium and at an object enveloped by the medium;
   detecting said pulses of light reflected back from said object after a time delay corresponding to the round-trip propagation time of said light pulses to and from said object; and
   converting said detected pulses of light to a video image of said object;
   wherein said step of detecting said reflected pulses of light further comprises the steps of;
   detecting a first image of the object against the backscattered light from the backscattering medium;
   detecting a second image of the shadow of the object against the backscattered light from the backscattering medium; and
   subtracting the first image from the second image to improve detectability and imaging of the object.

2. The method of claim 1 wherein:
   said short pulses comprise pulse widths of less than about 10 nanoseconds.

3. The method of claim 1 including:
   expanding said generated pulses of light by directing said pulses through optical means.

4. The method of claim 1 wherein:
   said first image is detected by first camera means and said second image is detected by second camera means.

5. The method of claim 1 including:
   colorizing the subtracted image to assist in identification of the object.

6. The method of claim 1 including:
   displaying said video image on cathode ray tube means.

7. The method of claim 1 wherein:
   said short pulses of light are generated by pulsed laser means.

8. The method of claim 7 wherein:
   said pulsed laser means comprises a pulsed Nd:YAG laser.

9. The method of claim 1 including:
   filtering said generated pulses of light.

10. The method of claim 9 including:
    using bandpass filter means to filter said pulses of light.

11. The method of claim 1 wherein:
    said backscattering medium is water and wherein said pulses of light are projected toward a surface of the water.

12. The method of claim 11 including:
    projecting said pulses of light from an airborne platform.

13. The method of claim 1 wherein:
    said pulses of light are detected by at least one camera means.

14. The method of claim 13 wherein:
    said camera means includes an intensified charge coupled device (CCD) sensor.

15. The method of claim 14 wherein said camera means further includes:
    fiber optic window means; and
    intensifier tube means, said fiber optic window means coupling said CCD sensor to said intensifier tube means to define said intensified CCD sensor.

16. An apparatus for detecting and imaging an object enveloped by a backscattering medium which is at least partially transmitting to light comprising:
    generating means for selectively generating short pulses of light;
    projecting means for projecting said short pulses of light toward the backscattering medium and at an object enveloped by the medium;
    detecting means for detecting said pulses of light reflected back from said object after a time delay corresponding to the round-trip propagation time of said light pulses to and from said object; and
    converting means for converting said detected pulses of light to a video image of said object;
    wherein said detecting means further comprises;
    first detecting means for detecting a first image of the object against the backscattered light from the backscattering medium;
    second detecting means for detecting a second image of the shadow of the object against the backscattered light from the backscattering medium; and
    means for subtracting the first image from the second image to improve detectability and imaging of the object.

17. The apparatus of claim 16 wherein:

said short pulses comprise pulse widths of less than about 10 nanoseconds.

18. The apparatus of claim 16 including:
means for expanding said generated pulses of light by directing said pulses through optical means.

19. The apparatus of claim 16 wherein:
said first detecting means comprises first camera means; and
said second detecting means comprises second camera means.

20. The apparatus of claim 16 including:
means for colorizing the subtracted image to assist in identification of the object.

21. The apparatus of claim 16 including:
means for visually displaying said video.

22. The apparatus of claim 16 wherein:
said generating means comprises pulsed laser means.

23. The apparatus of claim 22 wherein:
said pulsed laser means comprises a pulsed Nd:YAG laser.

24. The apparatus of claim 16 wherein:
said backscattering medium is water and wherein said pulses of light are projected toward a surface of the water.

25. The apparatus of claim 24 including:
means for projecting said pulses of light from an airborne platform.

26. The apparatus of claim 16 including:
means for filtering said generated pulses of light.

27. The apparatus of claim 26 wherein:
said filtering means comprises bandpass filter means.

28. The apparatus of claim 26 wherein:
said detecting means comprises at least one camera means.

29. The apparatus of claim 28 wherein:
said camera means includes an intensified charge coupled device (CCD) sensor.

30. The apparatus of claim 29 wherein said camera means further includes:
fiber optic window means; and
intensifier tube means, said fiber optic window means coupling said CCD sensor to said intensifier tube means to define said intensified CCD sensor.

31. A method of detecting and imaging an object enveloped by a backscattering medium which is at least partially transmitting to light including the steps of:
selectively generating short pulses of light;
projecting said short pulses of light toward the backscattering medium and at an object enveloped by the medium;
detecting said pulses of light reflected back from said object after a time delay corresponding to the round-trip propagation time of said light pulses to and from said object wherein glint detection means is used to detect the leading edge of light reflected back from said object; and
converting said detected pulses of light to a video image of said object.

32. The method of claim 31 wherein said pulse of light are detected by at least one camera means and including the step of:
gating said camera means on one pulse after said glint detection means detects the leading edge of the reflected light.

33. The method of claim 31 wherein said glint detection means comprises:
first photodiode means; and
pulse discriminator means operatively connected to said first photodiode means.

34. A method of detecting and imaging an object enveloped by a backscattering medium which is at least partially transmitting to light including the steps of:
selectively generating short pulses of light;
projecting said short pulses of light toward the backscattering medium and at an object enveloped by the medium;
detecting said pulses of light reflected back from said object using at least one camera means after a time delay corresponding to the round-trip propagation time of said light pulses to and from said object;
gating said camera means on one pulse after the leading edge of the reflected light is detected;
converting said detected pulses of light to a video image of said object.

35. A method of detecting and imaging from an airborne platform an object enveloped by water including the steps of:
selectively generating short pulses of light from an airborne platform;
projecting said short pulses of light toward the water and at an object enveloped by the water;
detecting said pulses of light reflected back from said object after a time delay corresponding to the round-trip propagation time of said light pulses to and from said object; and
converting said detected pulses of light to a video image of said object.

36. An apparatus for detecting and imaging an object enveloped by a backscattering medium which is at least partially transmitting to light comprising:
generating means for selectively generating short pulses of light;
projecting means for projecting said short pulses of light toward the backscattering medium and at an object enveloped by the medium;
detecting means for detecting said pulses of light reflected back from said object after a time delay corresponding to the round-trip propagation time of said light pulses to and from said object;
glint detection means for detecting the leading edge of light reflected back from said object; and
converting means for converting said detected pulses of light to a video image of said object.

37. The apparatus of claim 35 including:
gating means for gating said camera means on one pulse after said glint detection means detects the leading edge of the reflected light.

38. The apparatus of claim 35 wherein said glint detection means comprises:
fast photodiode means; and
pulse discriminator means operatively connected to said fast photodiode means.

39. An apparatus for detecting and imaging an object enveloped by a backscattering medium which is at least partially transmitting to light comprising:
generating means for selectively generating short pulses of light;
projecting means for projecting said short pulses of light toward the backscattering medium and at an object enveloped by the medium;
at least one camera means for detecting said pulses of light reflected back from said object after a time delay corresponding to the round-trip propagation time of said light pulses to and from said object;

gating means for gating said camera means on one pulse after the leading edge of the reflected light is detected; and converting means for converting said detected pulses of light to a video image of said object.

40. An apparatus for detecting and imaging an object enveloped by water comprising:

generating means for selectively generating short pulses of light;

projecting means for projecting said short pulses of light toward the water and at an object enveloped by the water;

detecting means for detecting said pulses of light reflected back from said object after a time delay corresponding to the round-trip propagation time of said light pulses to and from said object, said generating means, projecting means and detecting means all being positioned on an airborne platform; and converting means for converting said detected pulses of light to a video image of said object.

* * * * *